(12) United States Patent
Gilbert (10) Patent No.: US 7,779,751 B2
(45) Date of Patent: Aug. 24, 2010

(54) INTEGRATED BEVERAGE INFUSER AND LID

(75) Inventor: Tyler Sean Gilbert, Bellevue, WA (US)

(73) Assignee: Pacific Market International, LLC, Seattle, WA (US)

( * ) Notice: Subject to any disclaimer, the term of this patent is extended or adjusted under 35 U.S.C. 154(b) by 305 days.

(21) Appl. No.: 11/854,512

(22) Filed: Sep. 12, 2007

(65) Prior Publication Data

US 2008/0060526 A1    Mar. 13, 2008

Related U.S. Application Data

(63) Continuation-in-part of application No. 11/531,554, filed on Sep. 13, 2006, now abandoned.

(51) Int. Cl.
*A47J 31/00* (2006.01)
(52) U.S. Cl. .................... 99/318; 99/289 D; 99/284; 99/322
(58) Field of Classification Search ............. 99/284, 99/289 D, 317, 318, 319, 322; 426/77
See application file for complete search history.

(56) References Cited

U.S. PATENT DOCUMENTS

| | | |
|---|---|---|
| 2,099,996 A | 11/1937 | Beling |
| 3,964,631 A | 6/1976 | Albert |
| 3,967,748 A | 7/1976 | Albert |
| 4,099,642 A | 7/1978 | Nergard |
| 4,190,173 A | 2/1980 | Mason et al. |
| 4,401,014 A | 8/1983 | McGrail et al. |
| 5,153,977 A | 10/1992 | Toida et al. |
| 5,249,703 A | 10/1993 | Karp |
| 5,588,197 A | 12/1996 | Satomi et al. |

(Continued)

FOREIGN PATENT DOCUMENTS

EP            891736            1/1999

OTHER PUBLICATIONS

U.S. Appl. No. 11/854,512, filed Sep. 12, 2007, Gilbert.

(Continued)

*Primary Examiner*—Tu B Hoang
*Assistant Examiner*—Jianying Atkisson
(74) *Attorney, Agent, or Firm*—Davis Wright Tremaine LLP; George C. Rondeau, Jr.

(57) ABSTRACT

An integrated beverage infuser and lid are adapted for use with an insulated drinking vessel for brewing a consumable product, such as tea, in an insulated travel mug, tumbler, or the like. The lid includes a main body adapted for movable receipt on a drinking vessel that forms a downwardly directed, open-ended cavity. A fluid-permeable brewing basket defines an enclosable receptacle for removable receipt of the brewing consumable product. The basket is movable between a stowed position, substantially within the cavity above the liquid level of the hot water in the tumbler, and a deployed position, below and substantially outside of the cavity for submersion in the hot water contained in the drinking vessel. A lever arm forms a part of the transfer mechanism and has a portion that penetrates the main body to the outside thereof so that the transfer mechanism can be operated by an individual without removing the lid from the insulated drinking vessel, tumbler, or the like.

23 Claims, 5 Drawing Sheets

U.S. PATENT DOCUMENTS

| | | | |
|---|---|---|---|
| 5,680,951 A | 10/1997 | Feltman, III et al. | |
| 5,924,354 A * | 7/1999 | Court et al. | 99/318 |
| 6,076,538 A * | 6/2000 | Frankson | 134/117 |
| 6,095,033 A * | 8/2000 | Melton | 99/323.3 |
| 6,168,816 B1 * | 1/2001 | Hammond | 426/433 |
| D441,288 S | 5/2001 | Pillers et al. | |
| 6,763,964 B1 | 7/2004 | Hurlbut et al. | |
| 6,792,848 B1 | 9/2004 | Janky | |
| 2004/0182247 A1 | 9/2004 | Guerrero | |

OTHER PUBLICATIONS

U.S. Appl. No. 11/531,554, filed Sep. 13, 2006, Gilbert.

* cited by examiner

INTEGRATED BEVERAGE INFUSER AND LID

TECHNICAL FIELD

The invention relates to removable lids for beverage containers. More specifically, the invention relates to lids having means for brewing tea or other consumable products in the beverage container.

BACKGROUND OF THE INVENTION

Thermally insulated beverage containers have become increasingly popular with the public for use with hot beverages, such as coffee. Containers of this type, frequently referred to as "commuter mugs" or "travel tumblers", may also be used for cold beverages, such as iced tea. Hot beverages, such as coffee and tea, impose the most demanding thermal requirements on such a container. As a result, consumers have come to appreciate that double-walled, vacuum-insulated containers perform this function best. Such containers have sidewalls often manufactured from metal, particularly stainless steel, to withstand the high mechanical loading due to atmospheric pressure.

In either case, it is highly desirable to provide a selectively openable lid for the beverage container. The lid performs at least two functions, the first of which is to prevent the beverage from spilling out of the container when the user is not actually drinking the beverage. This feature is particularly important when a hot beverage is in the container so as to prevent the user from becoming burned or scalded if the container tips over. As a second function, the lid should provide for drinking the fluid at a constant rate and so as to prevent splashing or dribbling when the beverage is being drunk from the container. The lids for such containers are therefore typically provided with an open position for drinking, a closed position for sealing the container, and a third position in which the entire lid can be removed from the beverage container for cleaning. Lids of this type generally fall into three categories: twist-type lids, pushbutton-type lids, or so-called "flip lids". One example of a twist-type lid developed by the assignee of the present invention is disclosed in U.S. Pat. No. D441,288, issued on May 1, 2001 to Pillers et al. Examples of pushbutton lids are shown in U.S. Pat. No. 4,303,173, issued Feb. 26, 1980 to Nergard; U.S. Pat. No. 3,964,631, issued Jun. 22, 1976 to Albert; U.S. Pat. No. 3,967,748, issued Jul. 6, 1976 to Albert; and U.S. Pat. No. 4,099,642, issued Jul. 11, 1978 to Nergard. With respect to the second type of the lids disclosed in these above-identified patents, the user typically depresses a button near the rim of the second lid to remove a stopper-like device from an aperture in the lid. Releasing the button returns the stopper to its normally closed position. The assignee of the present invention has developed an improved pushbutton-type lid disclosed in U.S. Pat. No. 6,763,964 to Hurlbut et al. The device disclosed by Hurlbut et al. uses a unique rocker lever to simultaneously both open and close venting and drinking apertures for one-handed operation. U.S. Pat. No. D485,759 issued to Janky et al. discloses a flip-type lid having a portion on the top thereof that is pivotally received in a horizontal plane with respect to the generally circular lid configuration. The user merely flips a tab on the lid to expose both a drinking aperture and a venting aperture.

All of the above-described lids are typically received on an insulated container, either of the steel, double-walled vacuum type, or uninsulated (or foam insulated) plastic double-walled construction by means of threads, bayonet mounts, or the like.

These prior-art designs have admirably addressed the consumers' needs with respect to insulated beverage containers containing hot drinks, such as coffee or tea, or cold drinks, such as iced tea, which have been prepared in advance, poured into the drinking vessel, the lid attached, and the combination lid and drinking vessel transported by the user to a jobsite, school, or the like. In particular, the tumbler design when used in conjunction with the above-described lids, is well adapted for receipt in conventional drink-well receptacles of cars, trucks, boats, and the like for travel and commuting.

Nevertheless, changing consumer needs and tastes have exposed deficiencies with respect to the above prior-art designs. Specifically, consumers are beginning to show concern with respect to their caffeine consumption and, simultaneously, are becoming attracted to brewed beverages, such as green and herbal teas. Teas that require brewing can be premade at home, steeped in a conventional teapot, and then poured into the above-described insulated beverage container and lid combinations. Nevertheless, consumers are drawn to the "on the go" qualities associated with travel tumblers described above and may not prefer to wait at home for an infused beverage, such as tea, to be brewed prior to transfer to the insulated drinking container. Thus, some consumers merely place a teabag into their travel tumbler along with hot water. Within a few minutes, the tea has been appropriately steeped and the beverage is ready for consumption. However, the prior-art designs do not generally provide any means for either removing the teabag from the container, or removing the teabag from the hot water in the container without opening the lid, a procedure that is difficult, if not impossible, to perform in a commuting situation, such as driving an automobile. As a result, consumers typically allow the teabag to remain in the hot water, continuing to infuse the water beyond the recommended brewing time. As a result, the tea beverage is overbrewed, bitter, and undrinkable.

The above-described limitations of the prior art are exacerbated with respect to the highest quality teas and brewed consumable products, which are typically sold in loose form (i.e., not in a premade bag). The consumer is expected to load the loose tea or other consumable product into a metallic brewing basket for immersion into hot water for a predetermined steeping period. The brewing basket must then be removed at the end of the brewing period. Clearly, there is no convenient way to use such a brewing basket with existing insulated tumbler and lid designs in that there is no place to hang the chain that typically suspends the brewing basket within the brewing vessel, nor is it possible to capture the chain between the tumbler and the removable lid while attaching the lid to the beverage tumbler body in a fluid-tight manner.

Therefore, a need exists for an insulated beverage container and lid combination that accepts a loose consumable brewing product, such as tea, inside the lid and container combination, while allowing the user to control the brewing time, without the necessity of opening the beverage container.

SUMMARY OF THE INVENTION

It is therefore an object of the present invention to provide a removable lid for an insulated beverage container that can accept a consumable product to be brewed, such as tea.

It is a further object of the present invention to provide a removable lid for receiving a brewable commodity, which achieves the above object and which also permits the user to control the brewing time of the received consumable product, without opening the removable lid and beverage container combination.

It is yet another object of the present invention to provide a removable lid capable of receiving a brewable product, which achieves the above objects and which also accepts receipt of either a loose brewable product, such as loose tea, or a brewable product such as tea or ground espresso coffee in a sealed, permeable package, such as a teabag, coffee pod, or the like.

The invention achieves the above objects, and other objects and advantages, which will become apparent from the description that follows, by providing an integrated beverage infuser and lid for use with a drinking vessel having a main body defining a downwardly directed, open-ended cavity, a fluid-permeable brewing basket for receipt of a brewable product such as tea, and a transfer mechanism for moving the brewing basket between a stowed position, substantially within the cavity, and a deployed position, below and substantially outside of the cavity, for submersion of the brewing basket in a liquid contained in the drinking vessel (such as hot water). The transfer mechanism preferably includes an actuating lever, knob, or the like external to the main body and manipulable by a user when the lid is received on an insulated drinking vessel or container. In this manner, the user can load the brewing basket with a desired consumable product (e.g., looseleaf tea, a teabag, a brewing pod containing coffee or the like), fill the drinking vessel with hot water, install the lid onto the drinking vessel, and deploy the brewing basket into the hot water by actuating the external lever or the like. After a suitable brewing time has passed, the user can then again manipulate the actuating lever or the like to retract the brewing basket into the stowed position within the cavity so as to terminate the brewing process.

In preferred embodiments of the invention, the transfer mechanism includes a lever arm for moving the brewing basket between the stowed position and the deployed position. The lever arm has a first end thereof pivotally connected to the brewing basket and a second end thereof connected to an axle that passes through a sidewall of the main body. A free end of the axle is connected to the actuating lever or the like. The brewing basket is preferably provided with an edge, distal from the first end of the lever arm, forming a fulcrum for reacting against an inner side of the main body (i.e., a portion of the main body that is internal to the drinking vessel when the lid is received on the drinking vessel). A geometric relationship between a distance from the axle to the first end of the lever arm, and the first end of the lever arm to the fulcrum is selected so as to both maximize the deployment depth of the brewing basket with respect to the open-ended cavity, and to minimize to an acceptable level the torque applied to the axle and, thus, the external actuating lever or the like. In this manner, the manufacturer may choose from a variety of materials, such as metal and/or polymers, such as thermoplastics, for manufacture of the transfer mechanism. The external actuating lever is also preferably provided with a detent mechanism or the like to maintain the lever in a position corresponding to the stowed position of the brewing basket within the open-ended cavity against gravity, which otherwise biases the brewing basket to the deployed position.

DETAILED DESCRIPTION OF THE PREFERRED EMBODIMENTS

An integrated beverage infuser and lid in accordance with the principles of the invention are generally indicated at reference numeral 10 in the various Figures of the attached drawings, wherein numbered elements in the Figures correspond to like-numbered elements herein.

Figure 1:
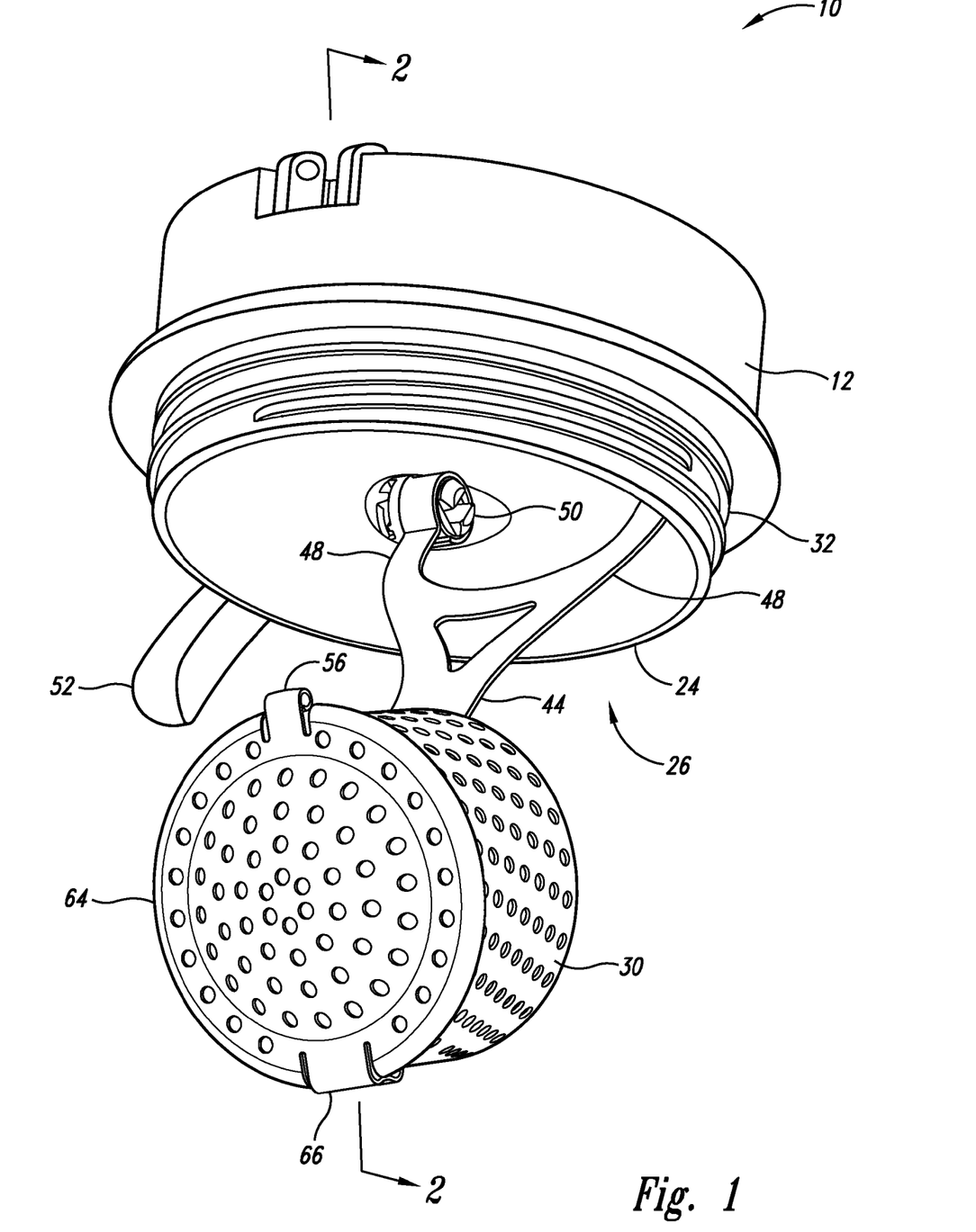
FIG. 1 is a perspective view of an integrated beverage infuser and lid for use with a drinking vessel in accordance with the principles of the invention, showing the brewing basket in a deployed position.
Figure 2:
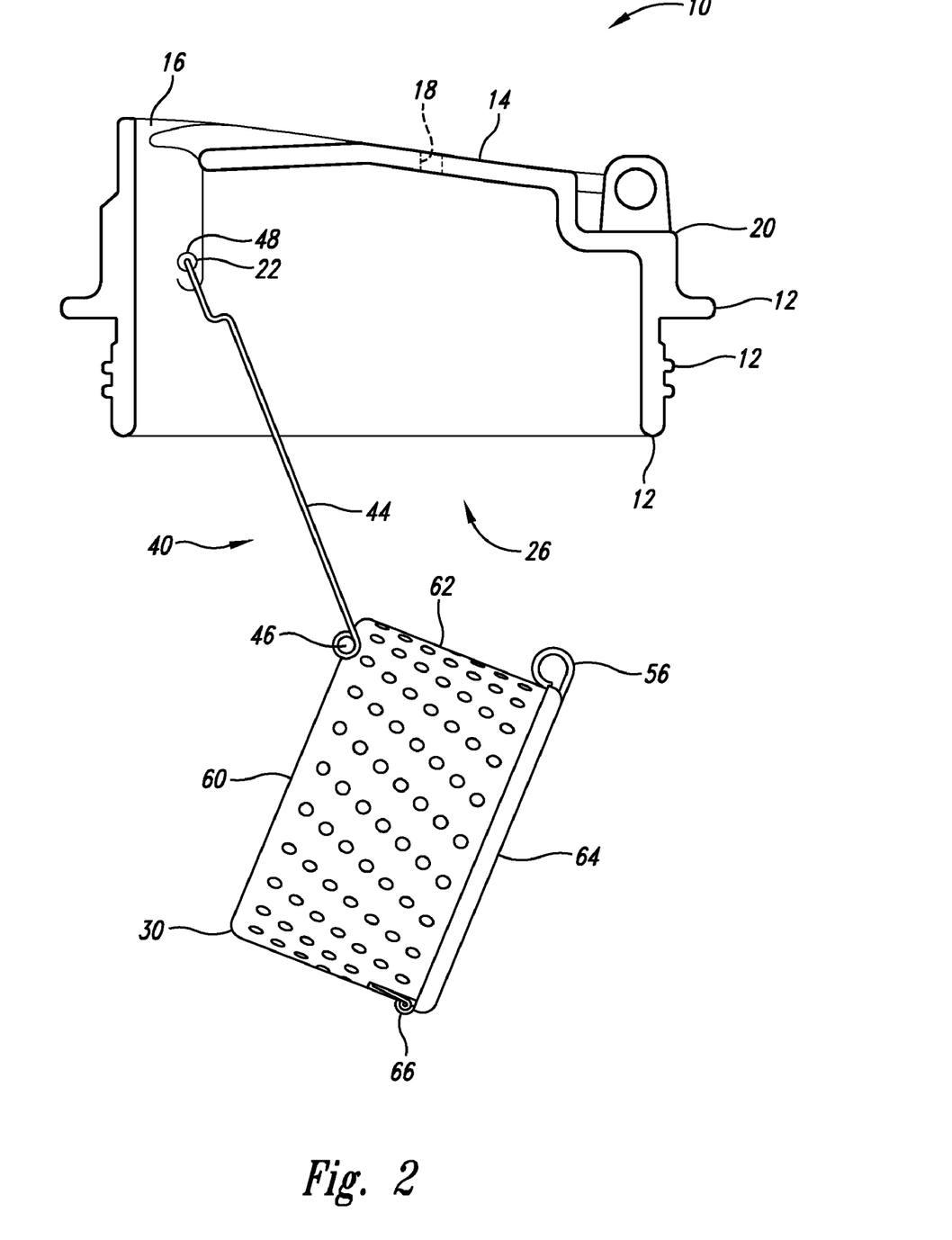
FIG. 2 is a sectional, side elevational view, taken along line 2-2 of FIG. 1.
Figure 3A:
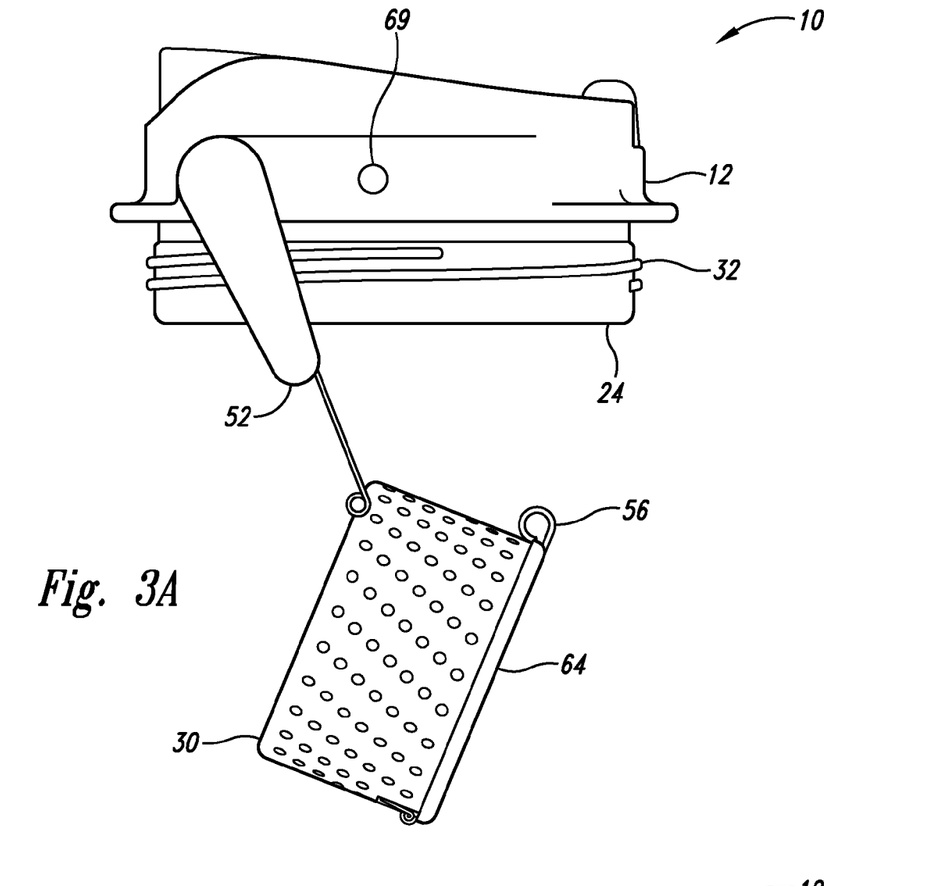
FIGS. 3a and 3b are side elevational views of the integrated beverage infuser and lid showing the brewing basket in both a deployed position, and a retracted or stowed position, respectively.
Figure 3B:
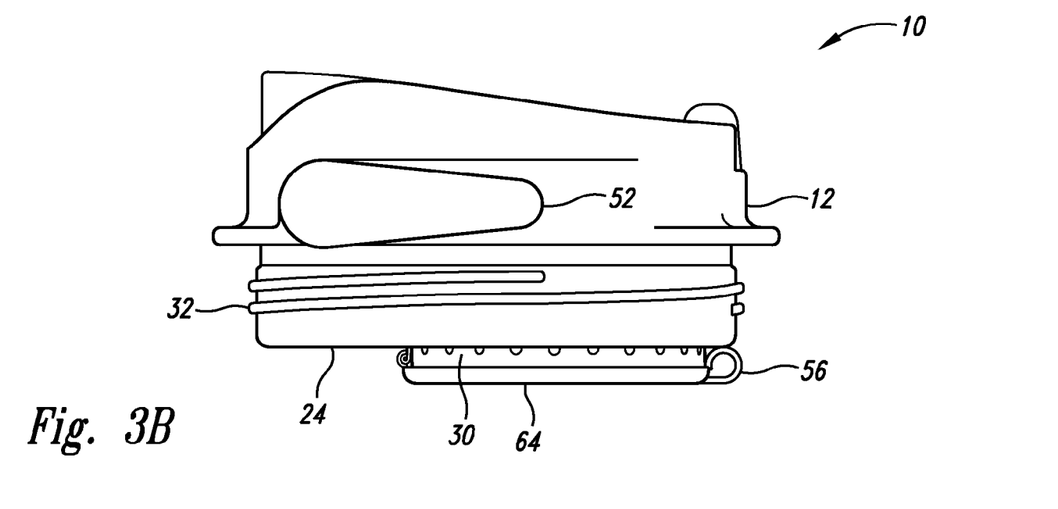
Figure 3C:
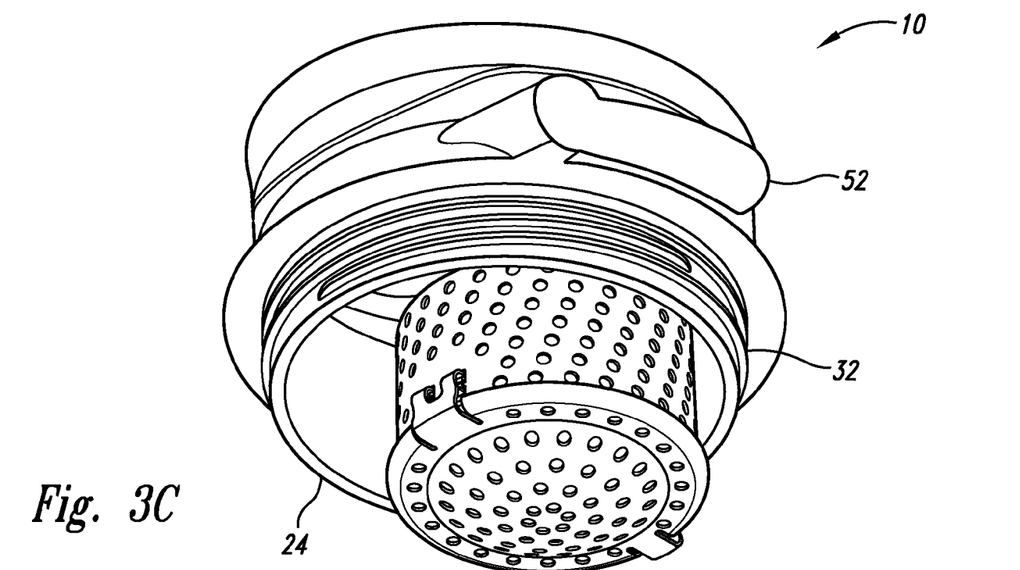
FIG. 3c is a bottom, left perspective view of the integrated beverage infuser and lid shown in FIGS. 3a and 3b with the brewing basket in the stowed position.
Figure 3D:
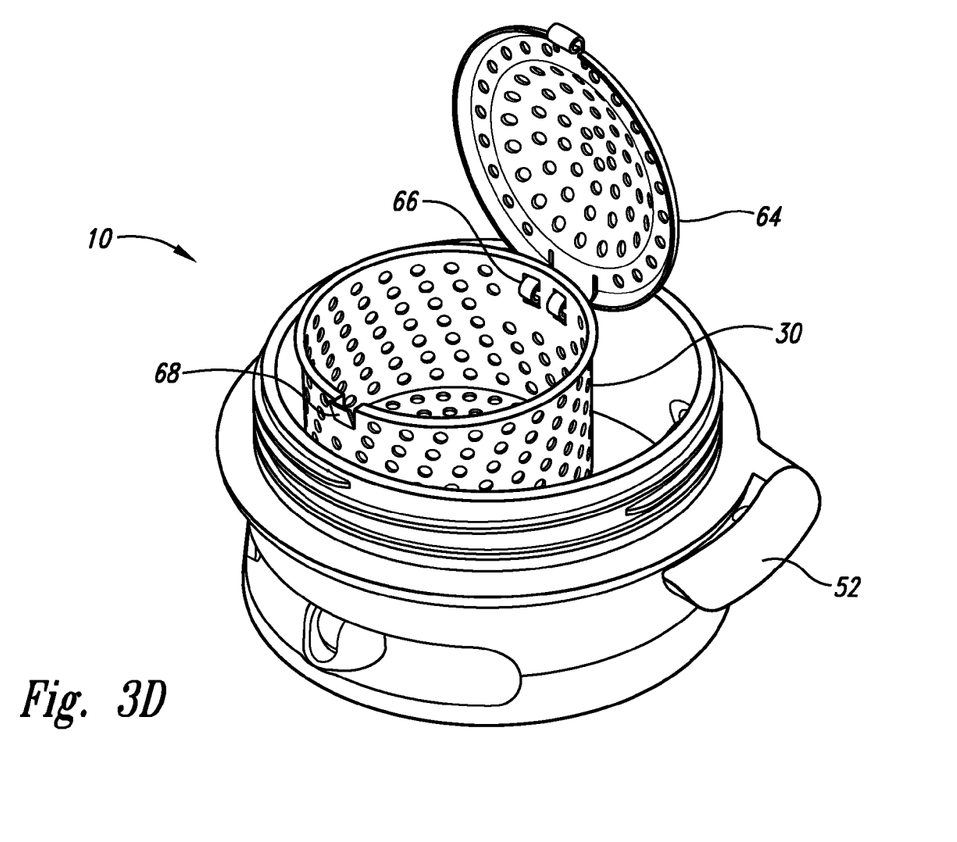
FIG. 3d is a top left perspective view of the integrated beverage infuser and lid in an inverted position, shown with the brewing basket opened for receipt of a consumable brewing product, such as loose tea.

As best seen in FIGS. 1 and 2, the lid 10 includes a substantially cylindrical main body 12 having a substantially planar upper portion 14, defining a drinking aperture 16 and a venting aperture 18. The main body also has a substantially annular sidewall, 20 defining a transverse axle bearing or sleeve 22 adjacent the drinking aperture 16. The annular sidewall 20 terminates in a circumferential lip 24, which, together with the annular sidewall, and planar upper portion defines a downwardly directed, generally open-ended cavity 26 for removable receipt of a perforated brewing basket 30 in a stowed position substantially within the cavity 26, as shown in FIGS. 3b, 3c, and 3d; and a deployed position, below and substantially outside of the cavity 26, as shown in FIGS. 1, 2, and 3a.

Figure 4A:
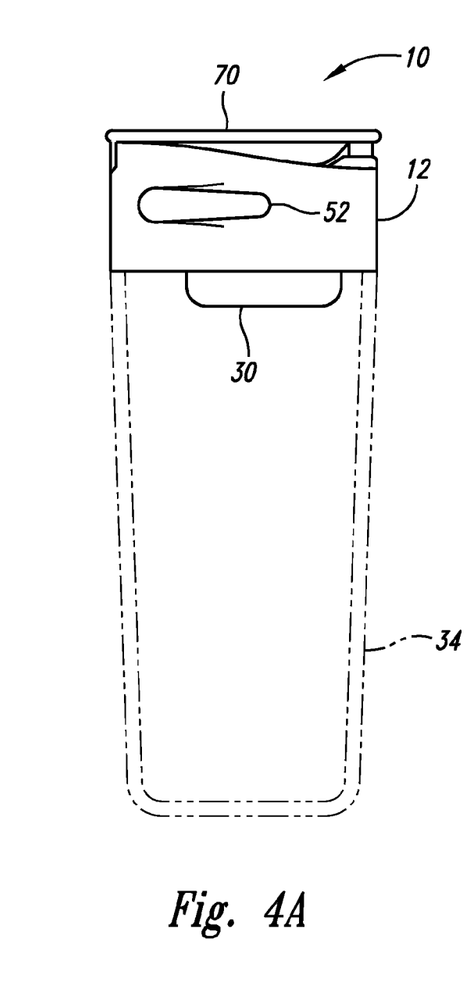
FIGS. 4a, 4b, and 4c are side elevational views of an alternate embodiment of the invention showing the brewing basket with the fulcrum in an alternate location.
Figure 4B:
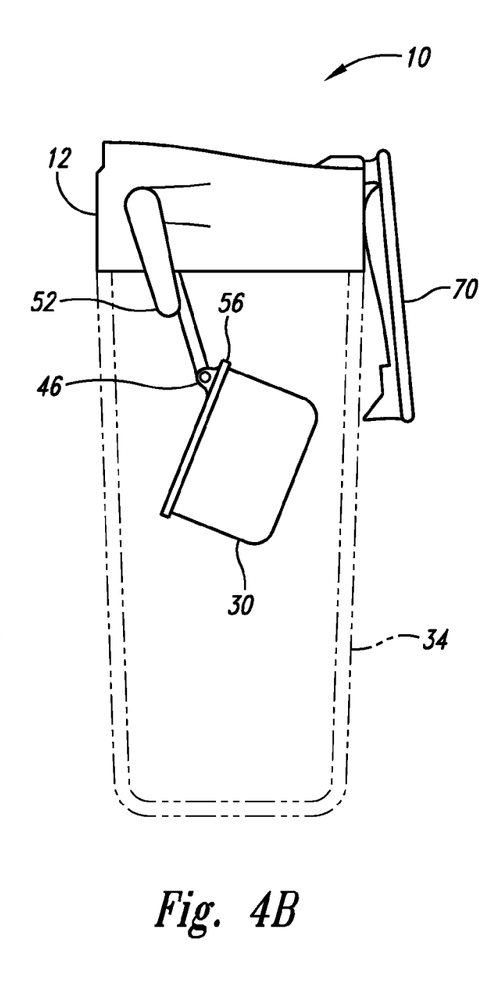
Figure 4C:
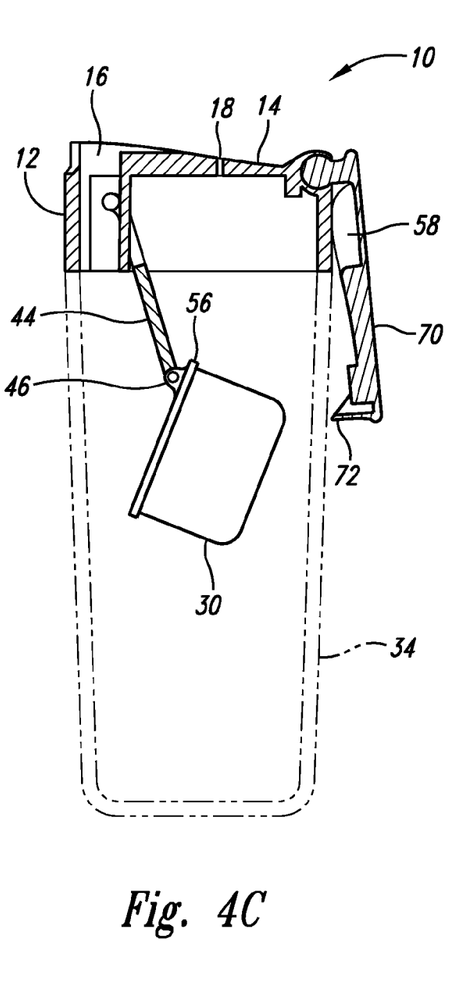

The main body 12 of the lid 10 is preferably provided with external threads 32 on an exterior surface of the annular sidewall 20 such that the lid can be received in an insulated tumbler or the like 34, shown in FIGS. 4a, 4b, and 4c. Those of ordinary skill in the art are well aware of other means for removably securing the lid 10 to the insulated tumbler 34, such as a bayonet mount, press fit, and the like, any of which is suitable for removably joining the lid to the tumbler in a leakproof, fluid-tight configuration.

The lid 10 is provided with a transfer mechanism generally indicated at reference numeral 40 including an elongated lever arm 44 having a first end 46 pivotally connected to the brewing basket 30, and a second end 48 connected to a transverse axle 50 that is journalled for rotation within the axle bearing 22 in the annular sidewall 20 of the main body 12 so as to penetrate the main body and be fixedly attached to an actuating lever 52 or the like, which is external to the main body 12. As will be apparent to those of ordinary skill in the art, rotating the actuating lever 52 applies a torque to the axle 50, thus rotating the lever arm 44 in either a clockwise fashion, as seen in FIGS. 1 and 2, so as to deploy the basket 30, or a counterclockwise fashion so as to raise the basket to the stowed position shown in FIGS. 3c and 4a. In order to stow the brewing basket 30 in a substantially nested position shown in FIGS. 3b, 3c, and 4a, the brewing basket 30 is provided with a fulcrum 56 on a distal edge of the basket with respect to the transverse axle 50 and first end 46 of the lever arm 44 for urging against an interior surface such as circumferential lip 24 of the main body 12. By selecting the length of the lever arm 44 as long as possible, (i.e., a lever arm distance—the distance defined between the transverse axle 50 and the first end 46 of the lever arm 44) and minimizing a fulcrum distance, defined as a distance between the first end 46 and the distal edge or fulcrum 56, the deployment distance of the brewing basket into hot water or the like contained within the insulating tumbler 34 is maximized. Such a configuration is optimized for brewing as it is desirable to place the brewing basket as close to the middle of the volume of hot water as possible. Nevertheless, this geometric configuration maximizes the torque on the transverse axle 50 and actuating lever 52 in a possibly disadvantageous manner. An example of an alternate embodiment of the invention employing a different configuration using an alternate geometry is shown in FIGS. 4a through 4c, in which the fulcrum 56 of the brewing basket 30 reacts against a protrusion 58 adjacent the upper surface portion 14 of the lid 10. In this configuration, it is preferable to manufacture the lever arm 44 from a sturdy material, such as stainless steel or a metal wire, as shown in FIG. 2 because of the increased torque applied to the lever arm.

Conversely, by minimizing the length of the lever arm 44 and maximizing the fulcrum distance between the first end 46 thereof and the fulcrum 56, torque on the axle 50 and actuating lever 52 is minimized. Consequently, the deployment distance will be greatly shortened and the effectiveness of the infusion process will be hampered. The applicants herein have discovered that a preferred distance between the lever arm's first end and the axle or axle bearing is approximately twice that of the fulcrum distance. In this configuration, the deployment distance of the basket is sufficient to provide proper infusion of hot water within the tumbler 34, while not placing an excessive torque on the transverse axle 50 or actuating lever 52. By controlling these parameters, the designer may depart from the specific embodiment shown herein with respect to the particular configuration of the lever arm 44 for the materials used in connection therewith. By way of example and not limitation, the embodiment shown in FIG. 1 employs a lever arm 44 in the form of a yoke having two second ends 48, each journalled for rotation within the annular sidewall 20 of the main body 12. In this embodiment, the torque is not so great and the geometric structure of the lever arm 44 is sufficiently robust so as to permit construction of the lever arm 44 from either metal or a polymer material. Conversely, the embodiments shown in FIGS. 4a through 4c are preferably manufactured with either a thickened lever arm 44, manufactured from a polymer such as thermoplastic, or a stronger material such as metal, due to the relatively short fulcrum distance between the first end 46 of the lever arm 44 and the fulcrum 56.

As shown in FIGS. 1, 2, and 3a through 3d, the brewing basket 30 is perforated throughout its exterior and is generally cylindrical in configuration. The brewing basket preferably has a substantially planar ceiling 60 connected to a downwardly depending circumferential sidewall 62. The basket includes a circular door 64 attached to the circumferential sidewall by a hinge 66 attached at one edge thereof. The fulcrum 56 on the distal edge of the basket is preferably a rolled-over portion of the door 64 to provide a circular bearing surface against the circumferential lip 24, as best seen in FIG. 3b.

In use, the user would turn the lid 10 upside down as shown in FIG. 3d and open the basket 30, as shown, to prepare the lid 10 for receipt of a consumable, brewable product, such as tea, (e.g., loose), a teabag, or a coffee brewing packet. The user would then close the door 66 such that the rolled-over portion at the fulcrum 56 will engage a tab 68 in a latching configuration so as to maintain the door 64 in a closed position. As shown in FIG. 3c, the user would then invert the entire lid 10 and connect the lid to a tumbler prefilled with hot water as shown in FIG. 4a. The user would then rotate the actuating lever 52 in a clockwise direction shown in FIG. 4b to deploy the basket 30 into the hot water contained within the insulated tumbler 34. Upon completion of an appropriate brewing time, the user would then counterrotate the actuating lever 52 in a counterclockwise direction to the position shown in FIG. 4a to terminate the brewing process. The main body 12 is preferably provided with a protrusion or pip 69 receivable in a corresponding detent in the actuating lever to selectively maintain the brewing basket 30 in the stowed position.

The lid 10 is also preferably provided with an external, articulated cap 70 having a drinking aperture plug 72 for sealing the drinking aperture 16 when the cap 70 is in the closed position, as shown in FIG. 4a. The cap 70 may be positioned as shown in FIGS. 4b and 4c to an open position to allow the user to drink from the drinking aperture 16. The venting aperture 18 is preferably positioned sufficiently distant from the drinking aperture 16 so that the user's lips do not cover the same. In this manner, air pressure within the tumbler will be equalized when fluid is removed from the drinking aperture 16.

Those of ordinary skill in the art will conceive of other embodiments of this invention upon reviewing this disclosure. For example, the actuating lever 52 may be in the form of a knob, dial, or the like, depending on the torque experienced by the transverse axle 50, which is dependent upon the ratio of the lever arm distance to the fulcrum distance. The materials used in construction of the lid 10 and basket 30, while presumably food-grade thermoplastic materials and stainless steel, respectively, are within the discretion of those of ordinary skill in the art. Furthermore, the specific configuration of the external, articulated cap 70 forms no part of this invention and is subject to modification by those of ordinary skill in the art without departing from the spirit of this invention. Thus, the invention is not to be limited to the above description, but is to be determined in scope by the claims that follow.

I claim:

1. A single serving drinking container assembly, comprising:
    a single serving drinking vessel; and
    an integrated beverage infuser and lid for use with the drinking vessel, comprising:
        a main body adapted for removable receipt on the drinking vessel, the main body having an upper portion defining a drinking aperture, a downwardly depending annular sidewall terminating in a circumferential lip and defining an axle bearing passing through the sidewall, wherein the main body sidewall, the main body upper portion, and circumferential lip together define a downwardly directed, open-ended cavity having an inner surface and an outer surface;
        a fluid-permeable brewing basket defining an enclosable receptacle for removable receipt of a brewing consumable product, the brewing basket having a portion forming a brewing basket fulcrum for engagement as the brewing basket is moved upward to move the brewing basket laterally inward;
        a transfer mechanism having a lever arm for moving the brewing basket between a stowed position wherein at least a portion of the brewing basket is disposed within the cavity, and a deployed position wherein the brewing basket is disposed below and outside of the cavity, for submersion in a liquid contained in the drinking vessel, the lever arm having a first end thereof pivotally connected to the brewing basket and a second end thereof connected to a transversely directed axle terminating in a free end journalled for rotation within the axle bearing and penetrating the main body sidewall such that the brewing basket is gravity biased toward the deployed position, wherein the brewing basket rotates about the brewing basket fulcrum when moving between the stowed position and the deployed position, and wherein the lever arm remains connected to both the brewing basket and the axle during movement of the brewing basket between the stowed position and the deployed position; and, an actuating lever connected to the axle's free end adjacent the cavity's outer surface for operating the transfer mechanism;

wherein the main body, brewing basket, transfer mechanism, and actuating lever form an integrated assembly.

2. The single serving drinking container assembly of claim 1, wherein the lever arm is elongated and the first end thereof is connected to a distal portion of the brewing basket when the brewing basket is in the stowed position so as to maximize the deployment depth of the brewing basket.

3. The single serving drinking container assembly of claim 2, wherein a lever arm distance defined between the lever arm's first end and the axle bearing is approximately twice that of a fulcrum distance defined between the lever arm's first end and the brewing basket fulcrum.

4. The single serving drinking container assembly of claim 3, wherein the brewing basket is cylindrical and has a planar ceiling, a downwardly depending circumferential sidewall, and an openable base pivotally connected to the circumferential wall.

5. The single serving drinking container assembly of claim 2, wherein the lever arm's first end and the fulcrum are adjacent each other.

6. The single serving drinking container assembly of claim 1, wherein the actuating lever and main body form a detent therebetween to maintain the brewing basket in the stowed position against the gravity bias.

7. The single serving drinking container assembly of claim 1, including a stopper pivotally connected to the main body to selectively close the drinking aperture.

8. The single serving drinking container assembly of claim 6, wherein the upper portion includes a vent aperture for equalizing pressure within the drinking vessel with ambient pressure when liquid is removed through the drinking aperture.

9. The single serving drinking container assembly of claim 1, wherein the actuating lever is elongated.

10. The single serving drinking container assembly of claim 1, wherein the main body is removably connected to the drinking vessel.

11. An integrated beverage infuser and lid for use with a single serving drinking vessel, comprising:

a main body adapted for removable receipt on drinking vessel, the main body defining a drinking aperture, and a downwardly directed, open-ended cavity having an inner surface and an outer surface;

a fluid-permeable brewing basket defining an enclosable receptacle for removable receipt of a brewing consumable product, the brewing basket having a portion forming a brewing basket fulcrum for engagement as the brewing basket is moved upward to move the brewing basket laterally inward;

transfer means for moving the brewing basket between a stowed position wherein at least a portion of the brewing basket is disposed within the cavity and a deployed position wherein the brewing basket is disposed below and outside of the cavity for submersion in a liquid contained in the drinking vessel such that the brewing basket is gravity biased toward the deployed position, wherein the brewing basket rotates about the brewing basket fulcrum when moving between the stowed position and the deployed position; and, actuating means for manually operating the transfer means;

wherein the main body, brewing basket, transfer means, and actuating means form an integrated assembly.

12. The integrated beverage infuser and lid of claim 11, wherein the main body further defines an axle bearing passing therethrough and the transfer means includes a lever arm having a first end thereof pivotally connected to the brewing basket and a second end thereof connected to a transversely directed axle terminating in a free end journalled for rotation within the axle bearing and penetrating the main body, wherein the lever arm is elongated and the first end thereof is connected to a distal portion of the brewing basket when the brewing basket is in the stowed position so as to maximize the deployment depth of the brewing basket.

13. The integrated beverage infuser and lid of claim 12, wherein a lever arm distance defined between the lever arm's first end and the axle bearing is approximately twice that of a fulcrum distance defined between the lever arm's first end and the brewing basket fulcrum.

14. The integrated beverage infuser and lid of claim 13, wherein the brewing basket is cylindrical and has a planar ceiling, a downwardly depending circumferential sidewall, and an openable base pivotally connected to the circumferential wall.

15. The integrated beverage infuser and lid of claim 12, wherein the lever arm's first end and the fulcrum are adjacent each other.

16. The integrated beverage infuser and lid of claim 11, wherein the actuating means includes an actuating lever, and wherein the main body and the actuating lever form a detent therebetween to maintain the brewing basket in the stowed position against the gravity bias.

17. The integrated beverage infuser and lid of claim 11, including a stopper pivotally connected to the main body to selectively close the drinking aperture.

18. The integrated beverage infuser and lid of claim 16, wherein the main body includes a vent aperture for equalizing pressure within the drinking vessel with ambient pressure when liquid is removed through the drinking aperture.

19. The integrated beverage infuser and lid of claim 11, wherein the actuating lever is elongated.

20. An integrated beverage infuser and lid for use with a drinking vessel, comprising:

a main body adapted for removable receipt on drinking vessel, the main body having an upper portion defining a drinking aperture and a venting aperture, and an annular sidewall directed downwardly therefrom defining an open-ended cavity;

a fluid-permeable, cylindrical brewing basket defining an enclosable receptacle for removable receipt of a brewing consumable, the basket having a portion forming a brewing basket fulcrum for engagement as the brewing basket is moved upward to move the brewing basket laterally inward;

a transfer mechanism for moving the brewing basket between a stowed position wherein at least a portion of the brewing basket is disposed within the cavity, and a deployed position, below and outside of the cavity, for submerging the basket in a liquid contained in the drinking vessel, wherein the brewing basket rotates about the brewing basket fulcrum when moving between the stowed position and the deployed position; and, actuating means for operating the transfer mechanism;

wherein the main body, brewing basket, transfer mechanism, and actuating means form an integrated assembly.

21. An integrated beverage infuser and lid for use with a drinking vessel, comprising:

a main body adapted for removable receipt on the drinking vessel, the main body having an upper portion defining a drinking aperture, a downwardly depending annular sidewall terminating in a circumferential lip and defining an axle bearing passing through the sidewall, wherein the main body sidewall, the main body upper portion, and circumferential lip together define a downwardly directed, open-ended cavity having an inner surface and an outer surface;

a fluid-permeable brewing basket defining an enclosable receptacle for removable receipt of a brewing consumable product, the brewing basket having a portion forming a brewing basket fulcrum for engagement as the brewing basket is moved upward to move the brewing basket laterally inward;

a transfer mechanism having a lever arm for moving the brewing basket between a stowed position wherein at least a portion of the brewing basket is disposed within the cavity, and a deployed position wherein the brewing basket is disposed below and outside of the cavity, for submersion in a liquid contained in the drinking vessel, the lever arm having a first end thereof pivotally connected to the brewing basket and a second end thereof connected to a transversely directed axle terminating in a free end journalled for rotation within the axle bearing and penetrating the main body sidewall such that the brewing basket is gravity biased toward the deployed position, wherein the brewing basket rotates about the brewing basket fulcrum when moving between the stowed position and the deployed position, and wherein the lever arm remains connected to both the brewing basket and the axle during movement of the brewing basket between the stowed position and the deployed position; and, an actuating lever connected to the axle's free end adjacent the cavity's outer surface for operating the transfer mechanism;

wherein the main body, brewing basket, transfer mechanism, and actuating lever form an integrated assembly.

22. The integrated beverage infuser and lid of claim 21, wherein the brewing basket has a top side and a lower side, the top side having a first perimeter portion toward the location of the second end of the lever arm and an opposite second perimeter portion away from the location of the second end of the lever arm, and the lower side having an opening sized for receiving and removing a material to be submerged in the liquid contained in the drinking vessel and a selectively operable lid for closing the opening, the first end of the lever arm being pivotally connected to the brewing basket at a location toward the first perimeter portion of the top side.

23. The single serving drinking container assembly of claim 1, wherein the brewing basket has a top side and a lower side, the top side having a first perimeter portion toward the location of the second end of the lever arm and an opposite second perimeter portion away from the location of the second end of the lever arm, and the lower side having an opening sized for receiving and removing a material to be submerged in the liquid contained in the drinking vessel and a selectively operable lid for closing the opening, the first end of the lever arm being pivotally connected to the brewing basket at a location toward the first perimeter portion of the top side.

* * * * *